Patented May 11, 1948

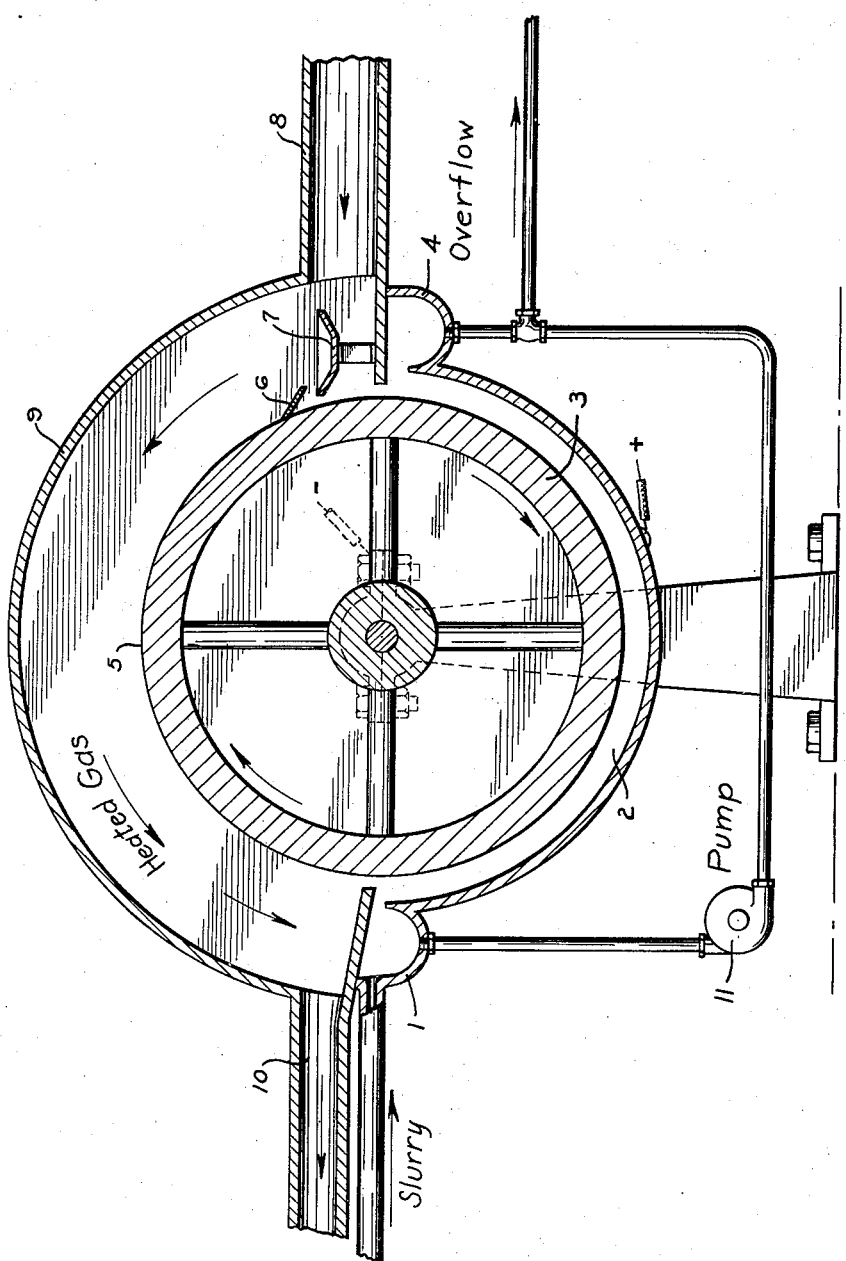

2,441,479

UNITED STATES PATENT OFFICE 2,441,479

APPARATUS FOR CATAPHORETICALLY TREATING A LIQUID SUSPENSION

Harmon F. Fisher, Palo Alto, Calif., assignor, by direct and mesne assignments, of one-half to Union Oil Company of California, Los Angeles, Calif., a corporation of California, and one-half to The Permanente Metals Corporation, a corporation of Delaware Original application December 22, 1941, Serial No. 424,018. Divided and this application December 27, 1943, Serial No. 515,792

1 Claim. (Cl. 204—300)

This application is a division of my application, Serial No. 424,018, filed December 22, 1941, for Separation of solids from liquids, and which is now Patent Number 2,376,535.

This invention relates to an apparatus for recovering finely divided solids capable of conducting current, such as metals and carbon, which are held in suspension in non-conducting fluid, particularly in a hydrocarbon medium.

It is an object of the invention to provide a device for separating two-phase systems consisting of one or more fine divided current-conducting solids dispersed in a non-conducting liquid, to obtain a concentrated solid phase and a cleared liquid phase. One of the primary objects of the invention is to provide means for concentrating magnesium metal dust finely dispersed in a hydrocarbon medium.

Magnesium partly results in the form of dust in the refining, by distillation, of crude electrolytically produced magnesium metal or of magnesium scrap, and particularly in the course of the recovery of metallic magnesium from oxidic magnesium compounds by thermic reduction, carried out at a temperature above the boiling point of metallic magnesium and followed by cooling down the vapor to a temperature below the solidification point of metallic magnesium. Magnesium dust obtained in one or the other of the above ways, particularly when partly in the state of colloidally fine subdivision, is highly reactive with oxygen and nitrogen and even spontaneously inflammable. It is old in the art to protect the dust against such unwanted conversions by immersing the same immediately after formation in a hydrocarbon oil medium or, in the case of its resulting from shock chilling the vapor evolved in the course of thermic reduction of magnesium oxide-containing starting materials, by using liquid hydrocarbons as the chilling medium proper. In any case the metallic magnesium is thus obtained in the state of slurry in the hydrocarbon, containing the metal in such a finely divided condition that only a minor proportion can be separated by settling. Conventional methods of separation, such as centrifuging, filtration, etc., will produce a slurry containing a fairly high proportion of solids, but have the disadvantage that a clear hydrocarbon is not recovered. The finely divided solids obtained as centrifuge overflow or filtrate will stay in suspension for periods of weeks without noticeable separation.

I have discovered that finely divided solids of this nature may readily be removed from a non-conducting dispersion medium by electrostatic means. When producing magnesium metal with the aid of an electrically heated reducing agent it is found that the solids are already electrically charged, and therefore, are readily drawn through the suspending medium to an electrode at a high potential of opposite sign. Normally these particles are positively charged and the repelling electrode will be at a positive potential of about 5,000 to 100,000 volts depending upon gap spacing, the nature of the hydrocarbon liquid, etc., while the collecting electrode will be grounded. When the particles are not sufficiently charged it may be necessary to have the repelling electrode at a higher potential difference above ground. Ionization in very small amount from one electrode is picked up by the particles which become charged and are carried to the collecting electrode of opposite sign where they are collected in the form of a dense slurry. Static or batch apparatus may be utilized to obtain the desired effect, with periodic scraping or flushing off of the solids collected. However, I have found that a particularly suitable apparatus for continuous operation may be utilized which consists, as described in greater detail below and shown schematically in the drawing, of a rotating cylindrical drum partially immersed in a bath of slurry.

The operation of the electrostatic separator may be observed in detail by reference to the drawing. Dirty feed enters the launder 1, extending the length of the drum, and overflows into the annular space 2, between the trough and the rotary drum 3. Drum 3 rotates counter-current to the flow of the hydrocarbon slurry. Solid particles are drawn to the drum under the influence of the electrostatic field and are deposited thereon in the form of a cake. The hydrocarbon medium is progressively clarified as it passes through the annular space and finally overflows as completely clear liquid free of all suspended solids into a discharge launder 4.

The cake 5 containing all of the solids removed from the slurry is carried on the surface of the drum to scraper 6 where it is scraped loose into a suitable conveyor 7 and removed from the system to suitable means for purification (not shown). When produced in the above described manner it is found that the cake contains about 40% solids and 60% hydrocarbon, by weight. In certain cases it is desired to obtain a cake containing 70 to 80% solids for convenience in handling and because of the plasticity desired. This I have found to be accomplished by passing a stream of inert gas, such as methane, natural gas, hydrogen or carbon monoxide, through inlet 8, over the cake 5 under a suitable hood 9, and out through discharge opening 10. The gas stream is preferably passed countercurrent to the drum rotation in order to make fullest use of available heat. Countercurrent flow of the gas has been found particularly advantageous in those cases where the hydrocarbon slurry introduced into launder 1 is at elevated temperatures. As a means of introducing the required heat to evaporate the hydrocarbon from cake 5, where this heat is not entirely furnished by the hot slurry introduced into launder 1, I have found that several methods may conveniently be used. For example, the gas stream may be heated by external means (not shown) before introduction through opening 8, or hood 9 may be externally heated and heat passed to the gas stream by radiation and convection, or electrical heating elements may be suspended in the gas stream between drum 3 and hood 9. In this manner, any desired proportion of solids and hydrocarbon may be obtained in the cake discharged into conveyor 7 by controlling the flow of gas and the amount of heat employed.

In the practice of my invention I have found that complete separation of suspended solids may be obtained under a wide range of slurry concentration and operating variables, such as drum size, speed of drum rotation, electrostatic potential, etc. Two unexpected phenomena have been discovered in practicing this invention, however, namely that finer particles are easier to remove than larger and more thoroughly agglomerated particles, and also that higher throughput of solids may be accomplished by using more dilute feed. It is preferable although not necessary to introduce into the collecting system some form of conventional settler or thickener to remove any exceptionally large particles. When such large particles are present they have a tendency to deposit as a layer in the bottom of annular space 2 from which they may conveniently be removed hydraulically by streams of hydrocarbon pumped into the annular space through jets, not shown in the drawing.

As an example of the practice of my invention, and also to show the effect of feed dilution the following experiment is illustrative. A slurry of crude magnesium metal dust, containing some magnesium oxide and carbon, suspended in a paraffinic hydrocarbon diluent having a boiling range of 300 to 400° F. was used for the experiment. The apparatus was substantially as described above, with the collecting drum grounded and the lower electrode or trough at a positive electrostatic potential of about 15,000 volts. The original feed contained 10% by weight of solids, and this was successively diluted with solvent to give slurries containing 5% and 2½% by weight of solids. Each of these feeds was then passed into the electrostatic separator while maintaining a constant drum speed to give exposed surface of 19.7 square feet per hour. The rate of feed of each slurry was gradually increased to the maximum which could be maintained to give a clear solvent overflow free of all suspended solids. The following data were obtained:

| Concentration of Solids in Slurry, Per Cent by Weight | Feed Rate, Gal./Hr. | Clear Solvent Production, Gal./Hr. | Drum Cake Production, Lbs./Hr. |
| --- | --- | --- | --- |
| 10 | 0.41 | 0.28 | 0.89 |
| 5 | 1.45 | 1.27 | 1.88 |
| 2½ | 2.78 | 2.19 | 2.24 |

These data indicate the advantages to be obtained when using a more dilute slurry. It is not always possible to obtain a slurry having the desired concentration, and it is part of my invention to dilute the slurry obtained with suitable clear solvent. The clear solvent may be obtained by circulation of clear solvent overflow from discharge 4 through pump 11 to the slurry line or directly into launder 1.

In the foregoing discussion emphasis has been placed upon the separation of crude magnesium from a hydrocarbon slurry. It is to be understood that my invention is broad in its general application and may be applied to the separation of any suspended solid material from a liquid hydrocarbon medium, provided only that the particles be charged, as in the case of the magnesium, or be capable of having a suitable charge placed thereon. As hydrocarbons it is to be understood that any normally liquid hydrocarbon or hydrocarbon mixture may be employed.

I claim:

In an apparatus for cataphoretically treating a liquid suspension, a stationary concave trough of impermeable material to contain the suspension to be treated, a horizontally disposed rotatable drum of electrical conducting material having its external surface partially submerged in said suspension and close to the trough wall to define an annular passageway between the drum surface and the concave surface of said trough, means for connecting a source of potential across said drum and said trough for energizing them of opposite polarity, an inflow launder disposed along one edge of the trough throughout substantially the entire length thereof to discharge said suspension into said passageway for effecting a uni-directional flow of said suspension in a circumferential direction around the underside of the surface of said drum, a discharge launder along the opposite edge of the trough to receive clear phase liquid from said passageway, a conduit leading from the discharge launder to the inflow launder and having means therein for re-circulating a portion of said clear liquid through said passageway for reducing the concentration of solids in said liquid suspension to thereby increase the rate of deposition of solids in said liquid suspension onto the surface of said drum, means for rotating said drum in a direction opposed to the flow of liquid in said annular passageway, said rotation of the drum serving to carry the solids deposited thereon from said liquid suspension upwardly out of the liquid suspension while still adhering to the drum, a hood enclosing the unsubmerged portion of the drum and through which a stream of heated gas is passed to flow over the unsubmerged surface of the drum in a direction opposed to the direction of rotation of said drum for decreasing the plasticity of the solid matter deposited thereon, and means disposed adjacent the discharge launder and above the liquid suspension for scraping said solid matter of decreased plasticity from the external surface of said drum.

HARMON F. FISHER.

REFERENCES CITED

The following references are of record in the file of this patent:

UNITED STATES PATENTS

| Number | Name | Date |
|---|---|---|
| 1,174,946 | Illig | Mar. 7, 1916 |
| 1,229,203 | Schwerin | June 5, 1917 |
| 1,514,955 | Dickey et al. | Nov. 11, 1924 |
| 1,719,984 | Klein et al. | July 9, 1929 |
| 1,855,809 | Sheppard et al. | Apr. 26, 1932 |
| 2,031,210 | Dillon et al. | Feb. 18, 1936 |
| 2,295,476 | Ibison | Sept. 18, 1942 |
| 2,300,283 | Fisher | Oct. 27, 1942 |

FOREIGN PATENTS

| Number | Country | Date |
|---|---|---|
| 520,481 | Great Britain | 1940 |